(12) United States Patent
Katterloher et al.

(10) Patent No.: US 6,520,558 B1
(45) Date of Patent: Feb. 18, 2003

(54) MOUNTING HARDWARE FOR A HARD TONNEAU COVER

(75) Inventors: Kurt Katterloher, Mississauga (CA); Willi Sitkei, Mississauga (CA); Brad Armstrong, Barrie (CA); Frank Shelton, Cheltenham (CA)

(73) Assignee: Decoma Exterior Trim Inc., Concord (CA)

( * ) Notice: Subject to any disclaimer, the term of this patent is extended or adjusted under 35 U.S.C. 154(b) by 0 days.

(21) Appl. No.: 09/913,199
(22) PCT Filed: Feb. 8, 2000
(86) PCT No.: PCT/CA00/00115
§ 371 (c)(1),
(2), (4) Date: Aug. 10, 2001
(87) PCT Pub. No.: WO00/47436
PCT Pub. Date: Aug. 17, 2000

Related U.S. Application Data
(60) Provisional application No. 60/119,322, filed on Feb. 9, 1999.

(51) Int. Cl.$^7$ .................................................. B60J 7/08
(52) U.S. Cl. ............................ 296/100.06; 296/100.07; 16/358; 16/359; 49/402
(58) Field of Search ....................... 296/100.02, 100.06, 296/100.07, 100.1, 76; 16/358, 359; 49/402

(56) References Cited

U.S. PATENT DOCUMENTS

| 4,756,571 | A | | 7/1988 | Lake | |
|---|---|---|---|---|---|
| 5,102,185 | A | * | 4/1992 | Lake | 296/100.07 |
| 5,104,175 | A | * | 4/1992 | Enninga | 296/100.1 |
| 5,195,796 | A | * | 3/1993 | Wampler, II | 16/358 |
| 5,503,450 | A | | 4/1996 | Miller | |
| 5,632,522 | A | * | 5/1997 | Gaitan et al. | 296/100.06 |
| 5,704,681 | A | | 1/1998 | Lambden | |
| 6,309,005 | B1 | * | 10/2001 | Priest et al. | 296/100.06 |

* cited by examiner

Primary Examiner—D. Glenn Dayoan
Assistant Examiner—Patricia L. Engle
(74) Attorney, Agent, or Firm—Clark Hill PLC

(57) ABSTRACT

A hinge assembly mounts a hard tonneau cover on a vehicle having a storage area. The assembly has a moveable hinge portion adapted for mounting on the tonneau cover and a stationary hinge portion adapted for mounting to the vehicle. A guided member co-acts with a guiding member for pivotally mounting the tonneau cover to the vehicle about an axis of rotation between a closed position. The guiding member positions the axis of rotation of the tonneau cover forwardly of an upper edge of the storage area allowing the forward edge of the tonneau cover to lift thereby minimizing damage to the peripheral seal.

18 Claims, 4 Drawing Sheets

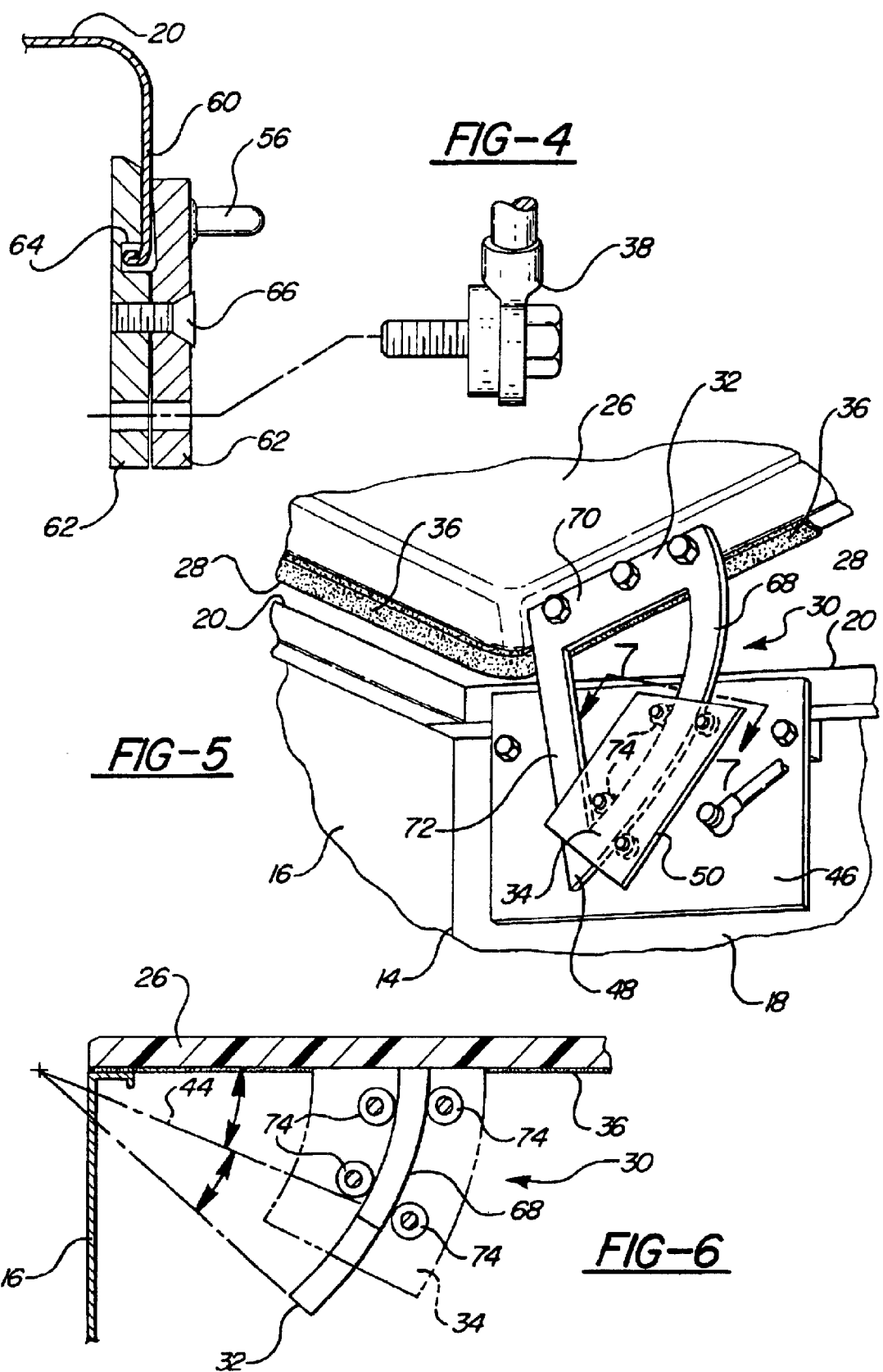

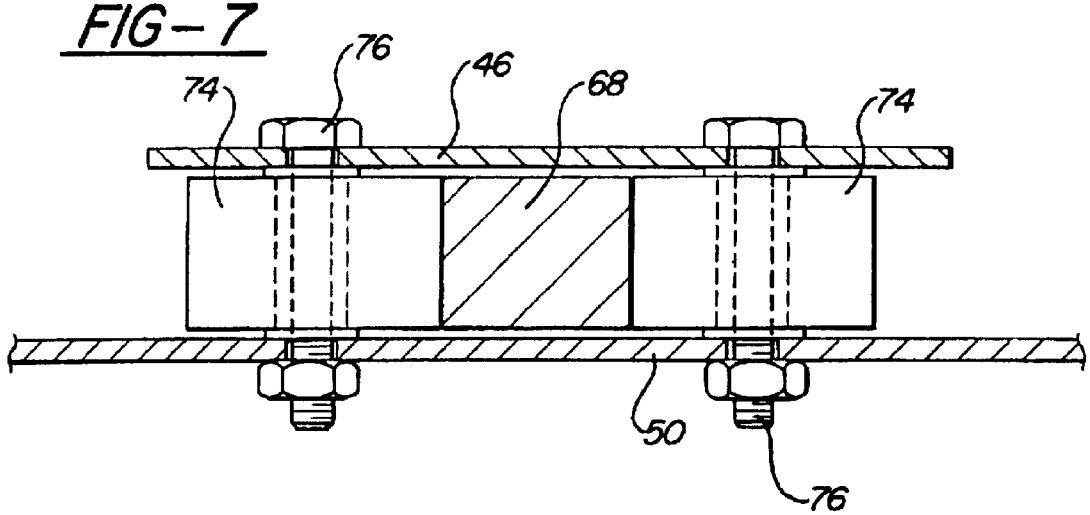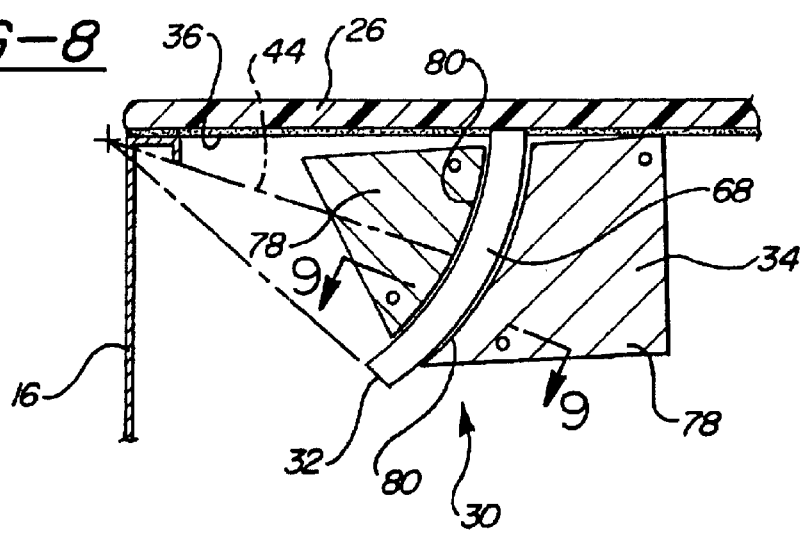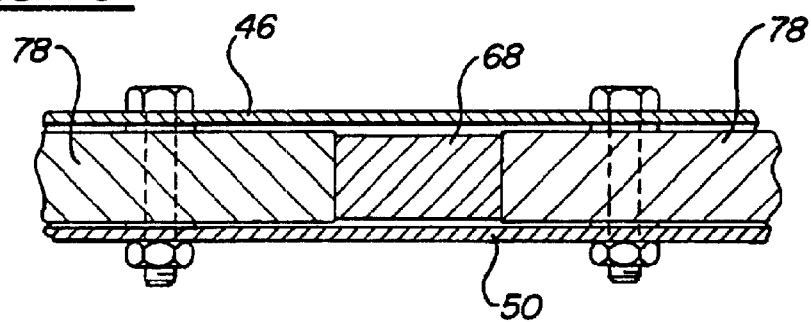

MOUNTING HARDWARE FOR A HARD TONNEAU COVER

This application claims the benefit of No. 60/119,322, filed Feb. 9, 1999.

FIELD OF THE INVENTION

This invention relates to a mounting hardware that can be used with a hard tonneau cover for a pick up truck. In particular, this invention relates to a hinge and mounting brackets for attaching a tonneau cover to a pick up truck.

BACKGROUND OF THE INVENTION

Hard tonneau covers are commercially available for covering the bed of a pick up truck. Typically, the tonneau cover is mounted to the truck box by a hinge so it can be opened and closed, allowing access to the truck box. The axis of the hinge is either parallel to the cross axis near the front of the box or parallel to the fore/aft axis of the vehicle.

Several types of hinging methods have been devised with a piano style hinge being most frequently used hinge system for the tonneau application. The piano style hinge is simple and performs the hinge function well. However, sealing between the tonneau and the truck box remains a problem.

The sealing problem is especially apparent when the hinge centerline is located on the front wall of the truck bed. The piano hinge occupies a portion or most of the available space on the top surface of the front truck wall. As a result, there is very little room for the placement of the seal in and around the hinge area. Consequently, the seal is either discontinued on either side of the hinge, is passed through the hinge or routed such that it is positioned ahead of the hinge. In the first case, the seal is discontinuous and has a high likelihood of leaking. In the second and third case, a continuous seal is achieved. However in the second case, the seal is pinched when the tonneau cover is closed and in the third case, the seal is pinched when the tonneau cover is open. The resulting repetitive pinching will reduce the integrity and usable lifespan of the seal.

In an effort to address these problems, other types of hinges for tonneau covers have been used. For example, scissor hinges have been used. For a scissor hinge, a pair of links are pivotally connected. The forward ends of each link are pivotally connected, while the opposite ends are slidably connected to the truck bed and the tonneau cover, respectively. The hinge will allow the hard tonneau cover to lift vertically relative to the track bed. This type of hinge avoids the cyclic compression problem experienced in other hinge types. However, a tonneau cover utilizing this type of hinge is awkward to close unless the closing force is applied on the center line of the tonneau cover. The reason for this is that at least two hinges are required per tonneau cover and that each hinge operates independently.

Accordingly, it would be desirable to provide a pivotable tonneau cover for a storage area of a pickup truck which includes a complete sealing area between the tonneau cover and the upper edge of the bed box. The hinge for the tonneau cover should be of a suitable and reinforced design in order to accommodate the relatively large size and weight of a typical hard tonneau cover. The hinge should also maintain a stable position of the tonneau cover during opening and closing of the tonneau cover. Finally, the hinge should be designed such that the tonneau cover is lifted upward and curved outward near the pivot point such that the seal does not significantly compress or excessively wear against the edge of the bed box.

SUMMARY OF THE INVENTION

The disadvantages of the prior art may be overcome by providing a hinge assembly which mounts a hard tonneau cover onto a vehicle having a storage area. The assembly has a moveable hinge portion adapted mounting on the tonneau cover and a stationary hinge portion adapted for mounting to the vehicle. A guided member co-acts with a guiding member for pivotally mounting the tonneau cover to the vehicle about an axis of rotation between a closed position. The guiding member positions the axis of rotation of the tonneau cover forwardly and away from of an upper edge of the storage area allowing the forward edge of the tonneau cover to lift thereby minimizing damage to the peripheral seal.

The subject invention therefore provides a pivotable tonneau cover for a storage area of a pickup truck which includes a complete sealing area between the tonneau cover and an upper edge of a bed box. In other words, the hinge does not interfere with a seal disposed on the tonneau cover.

The hinge for the tonneau cover includes moveable and stationary hinge portions which are suitably designed in order to accommodate the relatively large size and weight of a typical hard tonneau cover. The hinge portions also maintain a stable position of the tonneau cover during opening and closing of the tonneau cover.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a partially cross-sectional view of a strut mount with a strut spaced therefrom;

FIG. 5 is a fragmented perspective view of the bed box illustrating an alternative embodiment of the hinge;

FIG. 6 is a schematic side view of the hinge of FIG. 5;

FIG. 7 is a cross-sectional view taken along line 7—7 of FIG. 5;

FIG. 8 is a fragmented side view of another alternative embodiment of the hinge; and FIG. 9 is a cross-sectional view taken along line 9—9 of FIG. 8.

DETAILED DESCRIPTION OF THE PREFERRED EMBODIMENT

Figure 1:
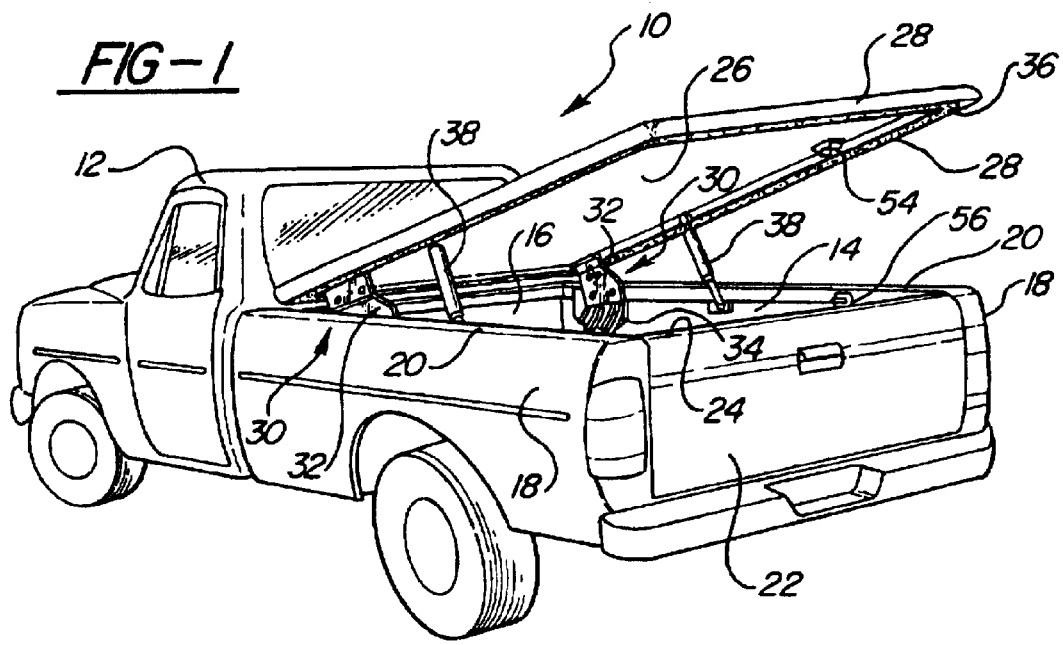
FIG. 1 is a perspective view of a pickup truck type vehicle incorporating aspects of the subject invention.

Referring to the Figures, wherein like numerals indicate like or corresponding parts throughout the several views, a pickup truck type vehicle is generally shown at 10 in FIG. 1. The vehicle 10 comprises a front passenger cab area 12 and a rear bed box 14 extending from the front cab area 12 to define a storage area for the vehicle 10. The bed box 14 has an upstanding front wall 16 interconnecting a pair of opposing upstanding side walls 18 with each of the walls 16, 18 having an upper edge 20.

A tailgate 22 is pivotally connected to a rear of the bed box 14 and mates with a rear of the upstanding side walls 18. The tailgate 22 includes an upper edge 24 which is aligned with the upper edges 20 of the front 16 and side 18 walls. The bed box 14 may be of any desired width, depth and length depending upon the particular model of truck and vehicle manufacturer. As appreciated, most bed boxes 14 have a rectangular configuration with the opposing side walls 18 being longer than the front wall 16 and tailgate 22. The subject invention, as subsequently described, is not dependent upon any particular style, design, make, size or model of bed box or pickup truck.

A tonneau cover 26 is disposed over the bed box 14. The tonneau cover 26 can be made from any suitable fiber reinforced plastic material. Other composite materials and methods of manufacture may also be incorporated.

The tonneau cover 26 includes an outer periphery 28 defining a sealing surface for selectively tonneau covering the storage area. In particular, the tonneau cover 26 includes first and second opposing ends and first and second opposing sides defining the outer periphery 28. The first or front end overlays the front wall 16 and is disposed adjacent the cab area 12 and the second or rear end overlays the tailgate 22. The tonneau cover 26 is preferably of a rectangular configuration which complements the rectangular shape of the bed box 14 such that the tonneau cover 26 completely closes the top of the storage area when the tonneau cover 26 is in the closed position.

In accordance with the subject invention, the tonneau cover 26 is pivotally mounted to the bed box 14 by at least one hinge assembly, generally shown at 30. The hinge assembly 30 includes a moveable hinge portion 32 mounted to the tonneau cover 26 and a stationary hinge portion 34 adapted for mounting to either one of the side walls 18. The moveable hinge portion 32 co-acts with the stationary hinge portion 34 for pivotally mounting the tonneau cover 26 to the vehicle 10 and to guide the tonneau cover 26 between a closed position overlaying the storage area and an open position spaced above the storage area. The tonneau cover 26 rotates about an axis of rotation extending generally transversely of the vehicle 10.

The hinge assembly 30 is characterized by one of the moveable 32 and stationary 34 hinge portions having a first curvature guide, and a second curvature guide different from the first curvature. As will be discussed in greater detail below with reference to the particular embodiments, the curvature of the guiding member moves the tonneau cover 26 initially substantially linear and then substantially arcuate from the closed position to the open position thereby ensuring that the tonneau cover 26 initially lifts from the edge 20, 24 during the opening of the tonneau cover 26.

The moveable hinge portion 32 is spaced from the outer periphery 28 of the tonneau cover 26 and the stationary hinge portion 34 is spaced from the upper edges 20 to allow the sealing surface to engage and seal with the upper edges 20 of the walls 16, 18 and the upper edge 24 of the tailgate 22 when the tonneau cover 26 is in the closed position covering the storage area. The positioning and design of the subject hinge portions 32, 34 allow the sealing surface to completely seal against the entire upper edges 20 of the walls 16, 18 including against the upper edge 24 of the tailgate 22.

The moveable hinge portion 32 is mounted near the first end of the tonneau cover 26 and the stationary hinge portion 34 is mounted near the front wall 16 of the bed box 14. Preferably, a pair of moveable hinge portions 32 are mounted adjacent the opposing sides of the tonneau cover 26 with a pair of corresponding stationary hinge portions 34 mounted to the opposing side walls 18 of the bed box 14. Hence, the hinges 30 are mounted to the front right and left corners of the bed box 14. This position of the hinges 30 is advantageous in that they do not obstruct into the cargo space of the bed box 14 and the tonneau cover 26 is adequately stabilized.

A seal 36 is disposed about the underside of the outer periphery 28 of the tonneau cover 26 for sealing with the edges 20, 24 when the tonneau cover 26 is in the closed position. During closing of the tonneau cover 26, the seal 36 substantially compresses against the upper edges 20, 24 of the bed box 14 and tailgate 22. The seal 36 ensures that the storage area is sealed from the atmosphere to prevent the intrusion of water, snow, dirt and other like debris.

Struts 38 are mounted between the tonneau cover 26 and the bed box 14 to assist in controlling the movement of the tonneau cover 26 and to hold the tonneau cover 26 in the open position. Struts 38 are of any suitable design or configuration, such as an air or hydraulic strut, as is known in the art. Struts 38 are sized to limit travel of the tonneau cover 26 so that the moveable hinge portion 32 does not disengage from the stationary hinge portion 34 during normal use.

Figure 3:
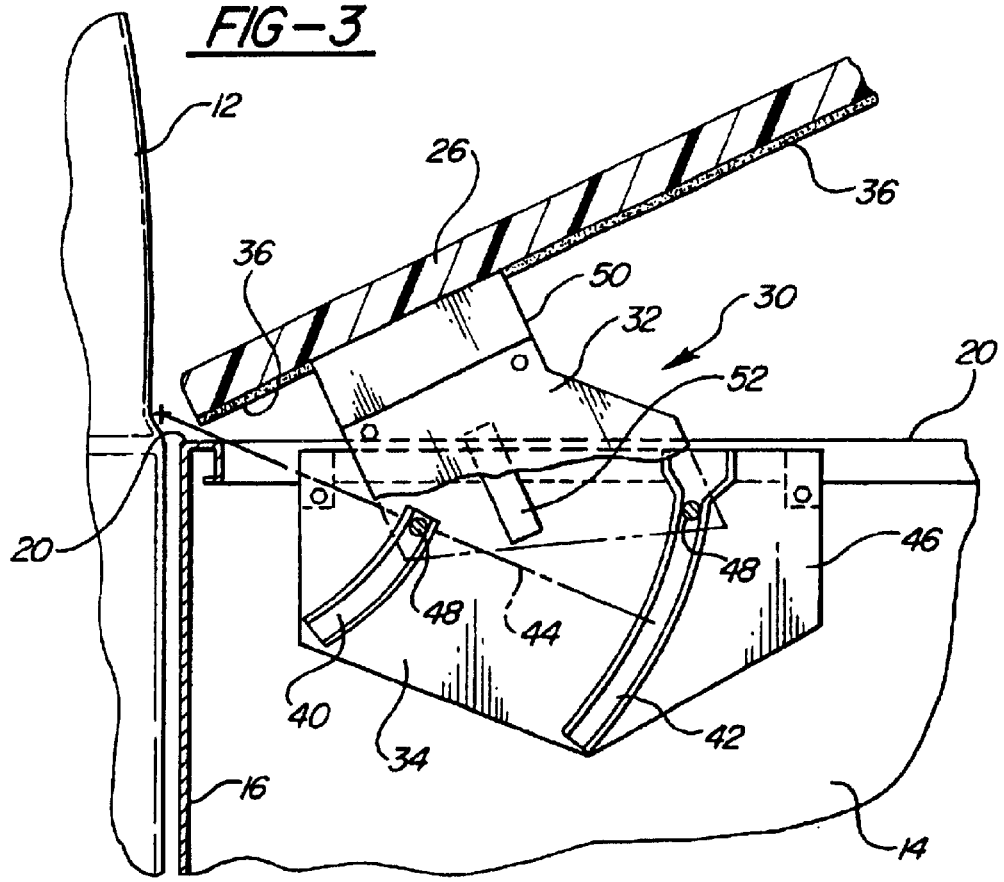
FIG. 3 is a side view of the bed box and hinge of FIG. 2.
Figure 2:
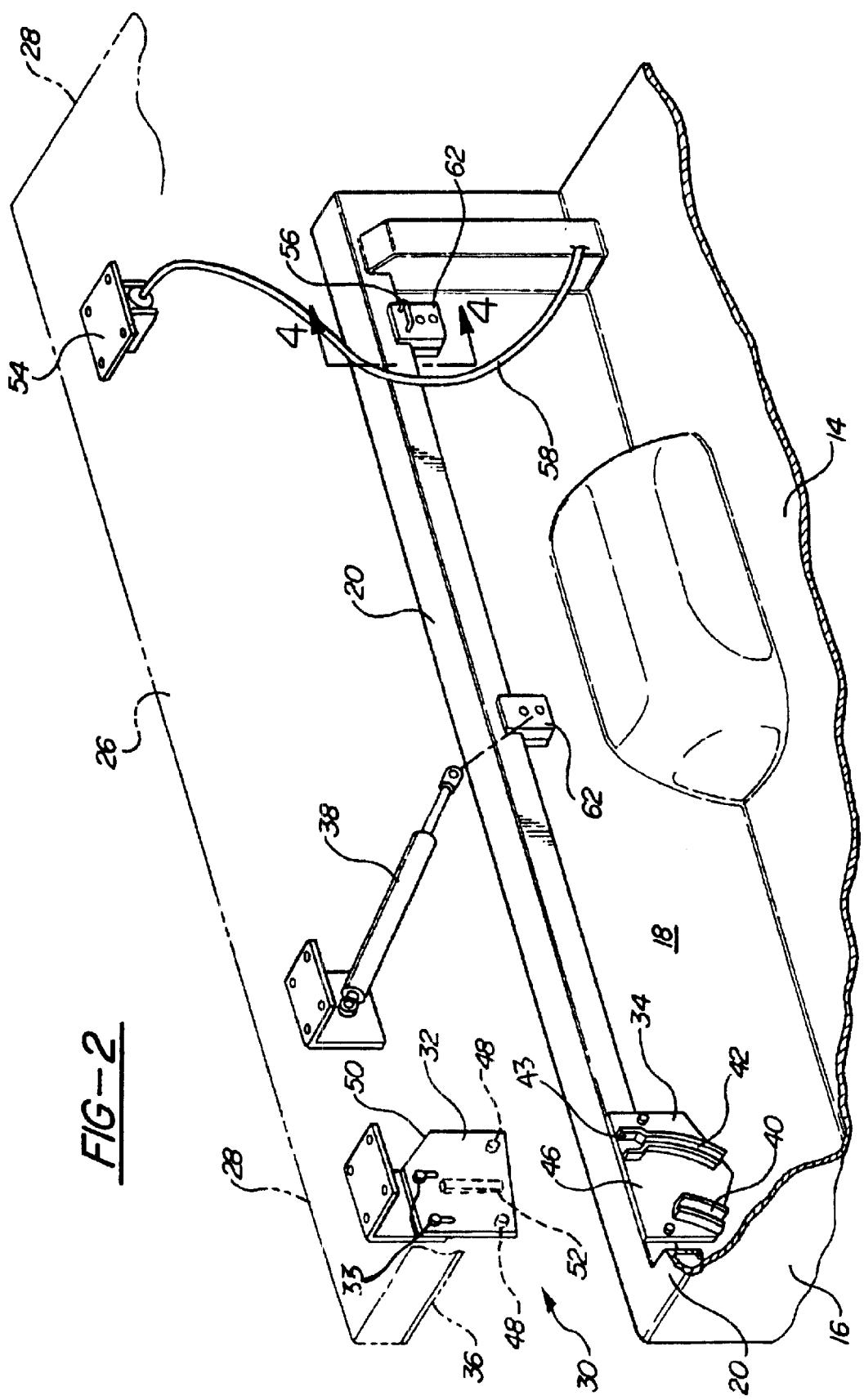
FIG. 2 is a fragmented perspective view of a bed box with a hard tonneau cover spaced therefrom and illustrating a preferred embodiment of a hinge.

Referring also to FIGS. 2 and 3, the preferred embodiment of the moveable 32 and stationary 34 hinge portions are illustrated in greater detail. The pair of hinges 30, which are preferably used to support the tonneau cover 26, are substantially mirror images of each other. Hence, only one binge 30 is shown and described in detail.

The stationary hinge portion 34 includes guiding member comprising a first arcuate track 40 defining a cam surface of a first radius and second arcuate track 42 defining the second radius of curvature, being concentric with the first radius. Tracks 40, 42 are preferably C-shaped channels. The first track 40 is shorter than the second track 42 and has an entry spaced below the second track 42. Second track 42 has a flared entry 43 at the upper end thereof. The orientation of the first track 40 relative to the second track 42 ensures the proper translating and pivoting movement of the tonneau cover 26 up and away from the upper edges 20, 24. Hence, the exact angles of curvature and orientation of the tracks 40, 42 are set such that the tonneau cover 26 will first move generally linearly upward and then move upward and arcuately forwardly when moving from the closed position to the open position.

The second track 42 has a radius of curvature 44. The center of the radius 44 extends from the second track 42 to or above edges 20, 24 and forwardly of front wall 16. In other words, the axis of rotation for the tonneau cover 26 is disposed forwardly of and at or above the sealing surface of the tonneau cover 26.

A first plate 46 supports the first 40 and second 42 tracks and is adapted for mounting to the vehicle 10. In particular, the first plate 46 is mounted between one of the side walls 18 of the bed box 14 and the tracks 40, 42. As discussed above, the first plate 46 is preferably mounted to one of the side walls 18 adjacent the front wall 16.

The moveable hinge portion 32 has a pair of guided members or pins 48 positioned to align with and engage the first 40 and second 42 tracks. An L-shaped bracket 50 is mounted to the tonneau cover 26 and supports hinge portion 32. Preferably, pins 48 have rollers to engage with the tracks 40, 42. Hinge portion 32 mounts to the bracket 50 by an elongated slot and bolt arrangement, which allows adjustment of the hinge portion 32 relative to the stationary hinge portion 34.

A stabilizer 52 is disposed between the first 46 and second 50 plates to maintain a desired lateral orientation of the tonneau cover 26 relative to the bed box 14 during the movement of the tonneau cover 26 between the open and closed positions. The stabilizer 52 is preferably a substantially rectangular plastic block which has a sloped forward end. The stabilizer 52 is mounted to the bracket 50 and slides relative to the first plate 46 to maintain the proper spacing between the plate 46 and bracket 50.

A latch 54 is disposed on the underside of the tonneau cover 26 to secure to the tonneau cover 26 to the bed box 14 when the tonneau cover 26 is in the closed position. A striker 56 is mounted to the bed box 14, co-acts with the latch 54 to selectively secure the tonneau cover 26 in the closed position. The latch 54 may be released by any suitable device such as Bowden cable 58. Further, the latch 54 and striker 56 may be of any size or configuration as is known in the art. Finally, there may be any number of latches 54 and strikers 56 disposed along the tonneau cover 26 and bed box 14.

Referring also to FIG. 4, the mount for mounting strut 38 is shown in greater detail. The bed box 14 includes a downwardly extending lip 60 projecting from the upper edges 20. The strut mount is mounted to the lip 60 of the bed box 14. Preferably, the mount includes a pair of plates 62 sandwiched about the lip 60 to secure the mount to the bed box 14. An integral notch 64 is provided on one of the plates 62 to engage a curved distal end of the lip 60. A bolt 66 or other suitable fastener is used to secure the two plates 62 together. As illustrated in spaced relationship to the striker plates 62, the strut 38 connected to a lower aperture in the plates 62. Hence, a similar pair of striker plates 62 may be used to mount the striker 56 to the bed box 14 in a similar manner.

In use, the tonneau cover 26 is moved between the open and closed positions in an arcuate path. However, since the axis of rotation of the tonneau cover is spaced forwardly of upper edge of front wall 16, the forward edge of the tonneau cover 26 lifts generally vertically. Increasing the radius of movement at the forward edge of the tonneau cover 26 increases the lifting movement as compared with the prior art piano hinge where the radial length at the forward edge is relatively short. As a result, the seal at the front edge of the tonneau cover 26 is not crushed in an uneven or a scissor-like manner.

The first embodiment is preferred in that the installation and removal of the tonneau cover 26 involves the attachment only of the struts 38. On installation, the tonneau cover 26 is positioned over the storage area. Struts 38 are attached to the plates 62. The tonneau cover 26 is lifted until the rearward one of the pins 48 is inserted into the flared end 43 of the second track 42 which will automatically position the forward one of the pins 48 into the first track 40. Hinge portion 32 can be finely adjusted by adjusting the bolts 33 thereby ensuring that the axis of rotation of the tonneau cover 26 is forwardly of and above the storage box. The tonneau cover 26 is now fully installed. To remove, the struts 38 are unbolted from plates 62 allowing the tonneau cover 26 to be rotated until the pins 48 exit the tracks 40, 42.

Referring to FIG. 5, an alternative embodiment of the hinge 30 is shown. Like numerals indicate like or corresponding parts between the preferred and alternative embodiments.

The moveable hinge portion 32 is further defined as a guided member 48 having an arcuate arm 68. The arcuate arm 68 has a curvature, the center of which is forwardly of the tonneau cover 26.

The guided member 48 preferably includes a radial arm 70 and a stop arm 72 interconnecting the arcuate arm 68 to form a sector shaped guided member 48. In order to achieve the desired curvature for the arcuate arm 68, the radial arm 70 is longer than the stop arm 72. The guided member 48 is illustrated with the arms 68, 70, 72 being integral; however, it is not essential for the intended function of the hinge 30. The radial arm 70 is mounted to the tonneau cover 26 with the arcuate arm 68 being directed through the plates 46, 50.

As illustrated in FIG. 6, the arcuate arm 68 has a radius of curvature 44. The radial line 44 extends from the arcuate arm 68 to or above a plane of the tonneau cover 26. In other words, the pivot point for the tonneau cover 26 is disposed behind and at or above the sealing surface of the torneau cover 26. As discussed above with reference to the preferred embodiment, during the upward pivoting movement of the tonneau cover 26 to the open position, the first end of the tonneau cover 26 initially rises in a vertical direction and then the tonneau cover 26 is pivoted toward the front wail 16.

The stationary hinge portion 34 has a guiding member comprising an arcuate track 34 co-acting with the arcuate arm 68 to direct the guided member 48 through the arcuate track 34 during the movement of the tonneau cover 26 between the closed and open positions. Hence, the arcuate arm 68 co-acts with the arcuate track 34 to direct the guided member 48 through the track 34 during the movement of the tonneau cover 26 between the closed and open positions.

The arcuate track 34 includes the first plate 46 adapted for mounting to the vehicle 10. The second plate 50 is mounted directly to and spaced from the first plate 46. The arcuate track 34 is disposed between the first 46 and second 50 plates to define a guided path for the guided member 48. The track 34 further includes a plurality of bearings 74 mounted between the first 46 and second 50 plates to further define the guide path. Bolts 76 pass through the bearings 74 to mount the bearings 74 to the plates 46, 50. The stop arm 72 abuts one of the bearings 74 when the tonneau cover 26 is in the open position which defines the upper pivotal position of the tonneau cover 26.

The bearings 74 are positioned to present an arcuate guide path. Specifically, a pair of bottom bearings 74 are angled toward the stop arm 72 in relation to a pair of top bearings 74. The bearings 74 may be of any suitable design or configuration as is known in the art.

Referring to FIG. 7, a cross-sectional view of the hinge 30 as depicted in FIGS. 5 and 6 is shown. The bolts 76 and bearing 74 arrangement is clearly shown. The width of the bearings 74 defines the spacing between the plates 46, 50 and the width of the guide path. The arcuate arm 68 has substantially the same width as the bearings 74 and the guide path. These tight tolerances creates a smooth operating tonneau cover 26 with minimal lateral sway of the tonneau cover 26.

Referring to FIGS. 8 and 9, another alternative embodiment of the hinge 30 is shown wherein like numerals indicate like or corresponding parts. The moveable hinge portion 32 has a guided member 48 which is similar to the guided member illustrated in the alternative embodiment of FIGS. 5–7. Specifically, the guide 48 has an arcuate arm 68 with a curvature.

The stationary hinge portion has an arcuate track 34 which includes a guiding member comprising a pair of blocks 78 mounted between the first 46 and second 50 plates. The blocks 78 include camming surfaces 80 defining the guide path for directing the arcuate arm 68 through the plates 46, 50. The blocks 78 define the spacing between the plates 46, 50 and the width of the guide path. The remaining aspects of this alternative embodiment are substantially the same as the preferred embodiment.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. A hinge assembly for mounting a hard tonneau cover on a vehicle having a storage area, said assembly comprising:
   a moveable hinge portion adapted for mounting on said tonneau cover,
   a stationary hinge portion adapted for mounting to the vehicle, one of said moveable and stationary hinge portions having a guided member and the other of said moveable and stationary hinge portions having a guiding member receiving said guided member, said guided member co-acting with said guiding member for pivotally mounting said tonneau cover to the vehicle to guide said tonneau cover about an axis of rotation between a closed position wherein said tonneau cover overlies an upper edge of said storage area and an open position, said guiding member positioning said axis of rotation forwardly of said upper edge of said storage area and having a radius of curvature defining said pivotal movement of said tonneau cover.

2. A hinge assembly as claimed in claim 1 wherein said guiding member is a pair of concentric tracks and said guided member is a pair of spaced apart pins.

3. A hinge assembly as set forth in claim 2 wherein one of said concentric tracks has a flared opening for receiving one of said pins and automatically positioning the other of said pins to enter the other of said concentric tracks.

4. A hinge assembly as claimed in claim 3 wherein said concentric tracks are C-shaped channels.

5. A hinge assembly as set forth in claim 4 further including a stabilizer disposed between said moveable and stationary hinge portions to maintain a desired lateral orientation of said tonneau cover during said pivotal movement.

6. A hinge assembly as claimed in claim 1 wherein said guiding member and said guided member have a radius of curvature defining said pivotal movement of said tonneau cover.

7. A hinge assembly as claimed in claim 6 wherein said guiding member is a series of rollers spaced to define an arcuate path through said rollers and said guided member is a sector positioned along said arcuate path.

8. A hinge assembly as claimed in claim 7 wherein said sector extends between arms of unequal length.

9. A hinge assembly as claimed in claim 8 wherein one of said arms engages a roller limiting an opening extent of said tonneau cover.

10. A hinge assembly as claimed in claim 9 wherein said sector and arms are integral with each other.

11. A hinge assembly as claimed in claim 6 wherein said guiding member is a block assembly having an arcuate opening therethrough and said guided member is a sector positioned in said arcuate opening.

12. A hinge assembly as claimed in claim 11 wherein said sector extends between arms of unequal length.

13. A hinge assembly as claimed in claim 12 wherein said sector and arms are integral with each other.

14. An assembly for mounting a hard tonneau cover on a pick up truck box having an upper edge along a front wall and two side walls defining said truck box, said assembly comprising:
   at least one strut for supporting said tonneau cover;
   a latch assembly for securing said tonneau cover in a closed condition; and
   a pair of hinge assemblies mountable on opposite side walls of said truck box for mounting said tonneau cover, said hinge assembly comprising;
   a moveable hinge portion adapted for mounting on said tonneau cover,
   a stationary hinge portion adapted for mounting to the vehicle, one of said moveable and stationary hinge portions having a guided member and the other of said moveable and stationary hinge portions having a guiding member receiving said guided member, said guided member co-acting with said guiding member for pivotally mounting said tonneau cover to the vehicle to guide said tonneau cover about an axis of rotation between a closed position wherein said tonneau cover overlies the upper edge of said storage area and an open position, said guiding member positioning said axis of rotation forwardly of said upper edge of said storage area and having a radius of curvature defining said pivotal movement of said tonneau cover.

15. An assembly as claimed in claim 14 wherein said guiding member is a pair of concentric tracks and said guided member is a pair of spaced apart pins.

16. An assembly as claimed in claim 15 wherein one of said concentric tracks has a flared opening for receiving one of said pins and automatically position the other of said pins to enter the other of said concentric tracks.

17. An assembly as claimed in claim 16 wherein said concentric tracks are C-shaped channels.

18. An assembly as set forth in claim 17 further including at least one stabilizer disposed between on of said moveable and stationary hinge portions to maintain a desired lateral orientation of said tonneau cover during said pivotal movement.

* * * * *

UNITED STATES PATENT AND TRADEMARK OFFICE
CERTIFICATE OF CORRECTION

PATENT NO. : 6,520,558 B1  Page 1 of 1
DATED : February 18, 2003
INVENTOR(S) : Katterhoher et al.

It is certified that error appears in the above-identified patent and that said Letters Patent is hereby corrected as shown below:

Column 1,
Line 22, insert -- the -- between "being" and "most";

Column 2,
Line 6, insert -- for -- between "adapted" and "mounting";

Column 4,
Line 28, delete "binge" and insert -- hinge -- therefor;

Column 5,
Line 9, delete "to" to read -- secure the tonneau cover --;
Line 11, delete "," and insert -- and -- therefor;
Line 29, insert -- is -- between "38" and "connected";

Column 6,
Line 12, delete "torneau" and insert -- tonneau -- therefor;
Line 17, delete "wail" and insert -- wall -- therefor;
Line 51, delete "creates" and insert -- create -- therefor;

Column 8,
Line 45, delete "position" and insert -- positioning -- therefor;
Line 50, delete "on" and insert -- one -- therefor.

Signed and Sealed this

Eighth Day of April, 2003

JAMES E. ROGAN
*Director of the United States Patent and Trademark Office*